(12) United States Patent
Kubota et al.

(10) Patent No.: US 8,773,028 B2
(45) Date of Patent: Jul. 8, 2014

(54) DIRECTION INDICATION LAMP CONTROL DEVICE, DIRECTION INDICATION DEVICE, AND METHOD OF CONTROLLING DIRECTION INDICATION DEVICE

(75) Inventors: Kenichi Kubota, Hanno (JP); Hideyuki Ono, Hanno (JP)

(73) Assignee: Shindengen Electric Manufacturing Co., Ltd, Tokyo (JP)

( * ) Notice: Subject to any disclaimer, the term of this patent is extended or adjusted under 35 U.S.C. 154(b) by 2 days.

(21) Appl. No.: 13/811,869

(22) PCT Filed: Oct. 31, 2011

(86) PCT No.: PCT/JP2011/075093
§ 371 (c)(1),
(2), (4) Date: Jan. 23, 2013

(87) PCT Pub. No.: WO2013/065106
PCT Pub. Date: May 10, 2013

(65) Prior Publication Data
US 2013/0147377 A1   Jun. 13, 2013

(51) Int. Cl.
*H05B 37/00* (2006.01)
(52) U.S. Cl.
USPC ....... 315/201; 340/815.45; 340/475; 315/185
(58) Field of Classification Search
CPC .... H05B 37/029; H05B 33/0803; G09F 9/33; B60Q 1/387
USPC .................. 315/201, 185, 200, 193, 224, 149; 340/475, 815.45
See application file for complete search history.

(56) References Cited

U.S. PATENT DOCUMENTS 7,005,978 B2 *   2/2006   Takeuchi et al. .............. 340/475

FOREIGN PATENT DOCUMENTS

JP          64-90831        7/1989
JP        2005-343409      12/2005

OTHER PUBLICATIONS

ISR for related PCT/JP2011/075093 mailed on Dec. 13, 2011.

* cited by examiner

*Primary Examiner* — Douglas W Owens
*Assistant Examiner* — Syed M Kaiser
(74) *Attorney, Agent, or Firm* — Ladas & Parry, LLP

(57) ABSTRACT

A direction indication lamp control device includes: a pulse signal generation unit that generates a pulse signal; a current control element having one end to which power supply voltage is supplied, a control terminal to which the pulse signal is supplied, and the other end which outputs a drive current, the other end of the current control element being connected to one end of an external direction indication switch, and the other end of the direction indication switch being connected to a direction indication lamp; and a leak detection unit that causes the pulse signal generation unit to decrease the amplitude of the pulse signal in a case where the drive current corresponding to a pulse wave of the pulse signal is equal to or less than a leak detection current value during a leak detection period.

14 Claims, 7 Drawing Sheets

DIRECTION INDICATION LAMP CONTROL DEVICE, DIRECTION INDICATION DEVICE, AND METHOD OF CONTROLLING DIRECTION INDICATION DEVICE

CROSS-REFERENCE TO RELATED APPLICATIONS

This application is the U.S. National Stage of International Patent Application No. PCT/JP2011/075093 filed on Oct. 31, 2011, the disclosure of which is hereby incorporated by reference in its entirety.

TECHNICAL FIELD

The present invention relates to a direction indication lamp control device, a direction indication device, and a method of controlling the direction indication device, which use an LED element as a direction indication lamp.

BACKGROUND ART

For example, a direction indication device as illustrated in FIG. 8 is known as a direction indication device for a motorcycle. The direction indication device includes a diode D101, a capacitor C101, a direction indication switch SW, a left-side direction indication lamp 102L, a right-side direction indication lamp 102R, an internal power source 103, an oscillator 104a, a buffer 104b, an N-type MOS transistor NM101, a comparator COMP101 for wire disconnection detection, and a current detection resistor R101. The left-side direction indication lamp 102L has a left-front-side bulb 102LF and a left-rear-side bulb 102LR which are connected to each other in parallel. The right-side direction indication lamp 102R has a right-front-side bulb 102RF and a right-rear-side bulb 102RR which are connected to each other in parallel. The diode D101 and the capacitor C101 function as a bootstrap circuit.

Operation of the direction indication device will be described. For example, when the direction indication switch SW is ON to the side of an L terminal, a terminal on the negative side of the capacitor C101 is grounded via the bulbs 102LF and 102 LR. Thus, current from a battery B flows through the capacitor C101 via the diode D101, and thus the capacitor C101 is charged. Accordingly, the internal power source 103, the oscillator 104a, a buffer 104b and the comparator COMP101, to which an internal power supply voltage Vcc is supplied from a terminal on the positive side of the capacitor C101, and to which a reference voltage VS is supplied from the terminal on the negative side, are activated. The internal power source 103 generates a voltage V101 or the like supplied to the comparator COMP101.

The activated oscillator 104a generates an oscillation pulse signal. The buffer 104b outputs the pulse signal by buffering the oscillation pulse signal. The N-type MOS transistor NM101 causes a drive current, a magnitude of the drive current corresponding to the amplitude of a pulse signal supplied to a gate, to flow from a drain to which the power supply voltage VDD is supplied, to a source. The drive current flows through the bulbs 102LF and 102LR of the direction indication lamp 102L via the current detection resistance R101 and the direction indication switch SW. Accordingly, the direction indication lamp 102L blinks at a period of the oscillation pulse signal.

In the direction indication device, in a case where any one of the front-side and rear-side bulbs 102 LF and 102 RF is wire-disconnected, the drive current is reduced. Consequently, the comparator COMP101 detecting an increase in the power supply voltage VDD resulting from a decrease in the drive current controls the oscillator 104a and thus causes a period of the oscillation pulse signal to be changed. Accordingly, since a blinking period of the direction indication lamp 102L is changed, the wire disconnection of the bulb may be reported to a user or the like.

Furthermore, the direction indication switch SW is a mechanical switch. Thus, when a cheap component with low waterproof performance is used as the direction indication switch SW, the leak current may flow via water even though the direction indication switch SW is OFF. Then, the direction indication device starts to work due to the leak current. However, because the leak current is smaller than the current necessary to light the bulbs 102LF, 102LR, 102RF, and 102RR, the blinking of the direction indication lamps 102L and 102R is not visually recognized, and this is not a problem in practice.

The direction indication device as disclosed in JP 1-90831 A is also known as a device similar to the direction indication device described above.

Incidentally, it is desired that an LED element is used as the direction indication lamps 102L and 102R of the direction indication device, instead of a bulb.

However, because the LED element is remarkably great in luminance efficiency compared with the bulb, there is a concern of the LED element emitting light to a degree of visually recognizable brightness due to the leak current from the direction indication switch SW. That is, regardless of the direction indication switch SW being OFF, there is a concern of the direction indication lamps 102L and 102R blinking.

DISCLOSURE OF THE INVENTION

An object of the present invention is to provide a direction indication lamp control device, a direction indication device, and a method of controlling the direction indication device, in which the lighting of an LED element as a direction indication lamp may be made less visible in a case where a leak current flows through a direction indication switch.

A direction indication lamp control device for controlling a direction indication lamp configured with LED elements connected in parallel, according to one aspect of the invention, includes:

a pulse signal generation unit that generates a pulse signal having a predetermined period;

a current control element including one end to which power supply voltage is supplied, a control terminal to which the pulse signal is supplied, and the other end which outputs a drive current, a magnitude of the drive current corresponding to amplitude of the pulse signal, the other end of the current control element being connected to one end of an external direction indication switch, and the other end of the direction indication switch being connected to the direction indication lamp; and a leak detection unit that causes the pulse signal generation unit to decrease the amplitude of the pulse signal in a case where the drive current corresponding to a pulse wave of the pulse signal is equal to or less than a leak detection current value during a leak detection period.

In the direction indication lamp control device, the leak detection current value may be smaller than the drive current corresponding to the pulse wave of the pulse signal when the direction indication switch is ON, and may be equal to or more than a leak current of the direction indication switch which flows when the direction indication switch is OFF.

In the direction indication lamp control device, the leak detection period may be shorter than a period of time for which the pulse wave of the pulse signal is output when the direction indication switch is ON.

In the direction indication lamp control device, the pulse signal generation unit may include:

an oscillator which generates an internal oscillation pulse signal having the predetermined period and buffers the internal oscillation pulse signal to output an oscillation pulse signal; and a buffer which buffers the oscillation pulse signal and outputs the buffered oscillation pulse signal as the pulse signal, the leak detection unit may include:

a comparator for low-current detection, which outputs a low-current detection signal in a case where the drive current is equal to or less than the leak detection current value; and a leak detection signal output unit which outputs a leak detection signal in a case where the low-current detection signal is output during the leak detection period and is reset at the timing of an occurrence of a pulse wave of the internal oscillation pulse signal, and the oscillator may stop outputting the oscillation pulse signal while the leak detection signal is output from the leak detection signal output unit.

In the direction indication lamp control device, the oscillator may include:

an oscillation pulse signal output terminal which outputs the oscillation pulse signal; and a switch element which shorts the oscillation pulse signal output terminal to one end of the direction indication switch while the leak detection signal is output from the leak detection signal output unit.

In the direction indication lamp control device, the pulse signal generation unit may include:

an oscillator which generates an internal oscillation pulse signal having the predetermined period and buffers the internal oscillation pulse signal to output an oscillation pulse signal; and a buffer which buffers the oscillation pulse signal and outputs the buffered oscillation pulse signal as the pulse signal, the leak detection unit may include:

a comparator, which outputs a low-current detection signal in a case where the drive current is equal to or less than the leak detection current value; and a leak detection signal output unit which outputs a leak detection signal in a case where the low-current detection signal is output during the leak detection period and is reset at the timing of an occurrence of a pulse wave of the internal oscillation pulse signal, and the oscillator may stop outputting the oscillation pulse signal in a case where the leak detection signal is output from the leak detection signal output unit while the pulse wave of the oscillation pulse signal is output, and resumes outputting the oscillation pulse signal after a predetermined period.

In the direction indication lamp control device, a period of time for which the pulse wave of the pulse signal is output when the direction indication switch is ON may range from 0.25 seconds to 0.5 seconds, and the leak detection period may be equal to or less than 200 microseconds.

The direction indication lamp control device may include:

a current clamp unit which limits the drive current to a current upper limit value by decreasing amplitude of the pulse signal, in a case where the drive current exceeds the current upper limit value;

a voltage clamp unit which limits a reference voltage of one end of the direction indication switch to a voltage upper limit value by decreasing the amplitude of the pulse signal, in a case where the reference voltage exceeds the voltage upper limit value; and a wire disconnection detection unit which outputs a wire disconnection detection signal in a case where the drive current corresponding to the pulse wave of the pulse signal is equal to or less than a wire disconnection detection value which is less than the current upper limit value, or in a case where the reference voltage is equal to the voltage upper limit value, the current upper limit value may be smaller than the drive current flowing through the direction indication lamp when the reference voltage is the voltage upper limit value.

In the direction indication lamp control device, the current upper limit value may be greater than the drive current which flows through the direction indication lamp when the reference voltage is the voltage upper limit value in a case where it is assumed that any one of the LED elements is disconnected.

In the direction indication lamp control device, the wire disconnection detection value may be greater than the drive current which flows through the direction indication lamp when the reference voltage is the voltage upper limit value in a case where it is assumed that any one of the LED elements is disconnected.

In the direction indication lamp control device, the pulse signal generation unit may operate using a potential difference between an internal power supply voltage supplied from an external bootstrap circuit, and the reference voltage, as a power source, and the bootstrap circuit may generate the internal power supply voltage based on the reference voltage when the direction indication switch is ON.

In the direction indication lamp control device, the bootstrap circuit may include:

a rectifier, the power supply voltage being applied to one end of the rectifier; and a capacitor, one end of the capacitor being connected to the other end of the rectifier and the other end of the capacitor being connected to one end of the direction indication switch, a voltage of one end of the capacitor may be the internal power supply voltage, and a voltage of the other end of the capacitor may be the reference voltage.

In the direction indication lamp control device, the current control element may be configured with an N-type MOS transistor that includes a drain to which the power supply voltage is supplied, a gate to which the pulse signal is supplied, and a source connected to the direction indication switch.

A direction indication device according to one aspect of the invention includes:

a pulse signal generation unit that generates a pulse signal having a predetermined period;

a current control element that includes one end to which the power supply voltage is supplied, a control terminal to which the pulse signal is supplied, and the other end which outputs a drive current having a magnitude corresponding to amplitude of the pulse signal;

a direction indication switch, one end of the direction indication switch being connected to the other end of the current control element;

a direction indication lamp configured with LED elements connected in parallel, one end of the direction indication lamp being connected to the other end of the direction indication switch, and the other end of the direction indication lamp being grounded; and a leak detection unit that causes the pulse signal generation unit to decrease the amplitude of the pulse signal in a case where the drive current corresponding to a pulse wave of the pulse signal is equal to or less than a leak detection current value during a leak detection period.

In the direction indication device, the leak detection current value may be smaller than the drive current corresponding to the pulse wave of the pulse signal when the direction indication switch is ON, and may be equal to or more than a leak current of the direction indication switch which flows when the direction indication switch is OFF.

In the direction indication device, the leak detection period may be shorter than a period of time for which the pulse wave of the pulse signal is output when the direction indication switch is ON.

A method of controlling a direction indication device according to one aspect of the invention, that includes a pulse signal generation unit that generates a pulse signal having a predetermined period, a current control element that includes one end to which the pulse signal is supplied, a control terminal to which the pulse signal is supplied, and the other end that outputs a drive current having a magnitude corresponding to amplitude of the pulse signal, a direction indication switch, one end of the direction indication switch being connected to the other end of the current control element, and a direction indication lamp configured with LED elements connected in parallel, one end of the direction indication lamp being connected to the other end of the direction indication switch, and the other end of the direction indication lamp being grounded, includes causing the pulse signal generation unit to decrease the amplitude of the pulse signal in a case where the drive current corresponding to a pulse wave of the pulse signal is equal to or less than a leak detection current value during a leak detection period.

In the method of controlling a direction indication device, the leak detection current value may be smaller than the drive current corresponding to the pulse wave of the pulse signal when the direction indication switch is ON, and may be equal to or more than a leak current of the direction indication switch which flows when the direction indication switch is OFF.

In the method of controlling a direction indication device, the leak detection period may be shorter than a period of time for which the pulse wave of the pulse signal is output when the direction indication switch is ON.

According to the present invention, in a case where the drive current corresponding to a pulse wave of a pulse signal is equal to or less than a leak detection current value during a leak detection period, a leak detection unit causes the amplitude of the pulse signal to decrease. Accordingly, in a case where the leak current flows through a direction indication switch in an OFF state, a drive current may be decreased by the amplitude of the pulse signal being decreased. Therefore, because the period of time for the leak current to light the LED element may be limited, the lighting of the LED element due to the leak current may be made less visible.

MODES FOR CARRYING OUT THE INVENTION

Embodiments according to the present invention are described below based on the drawings.

Embodiment 1

Figure 1:
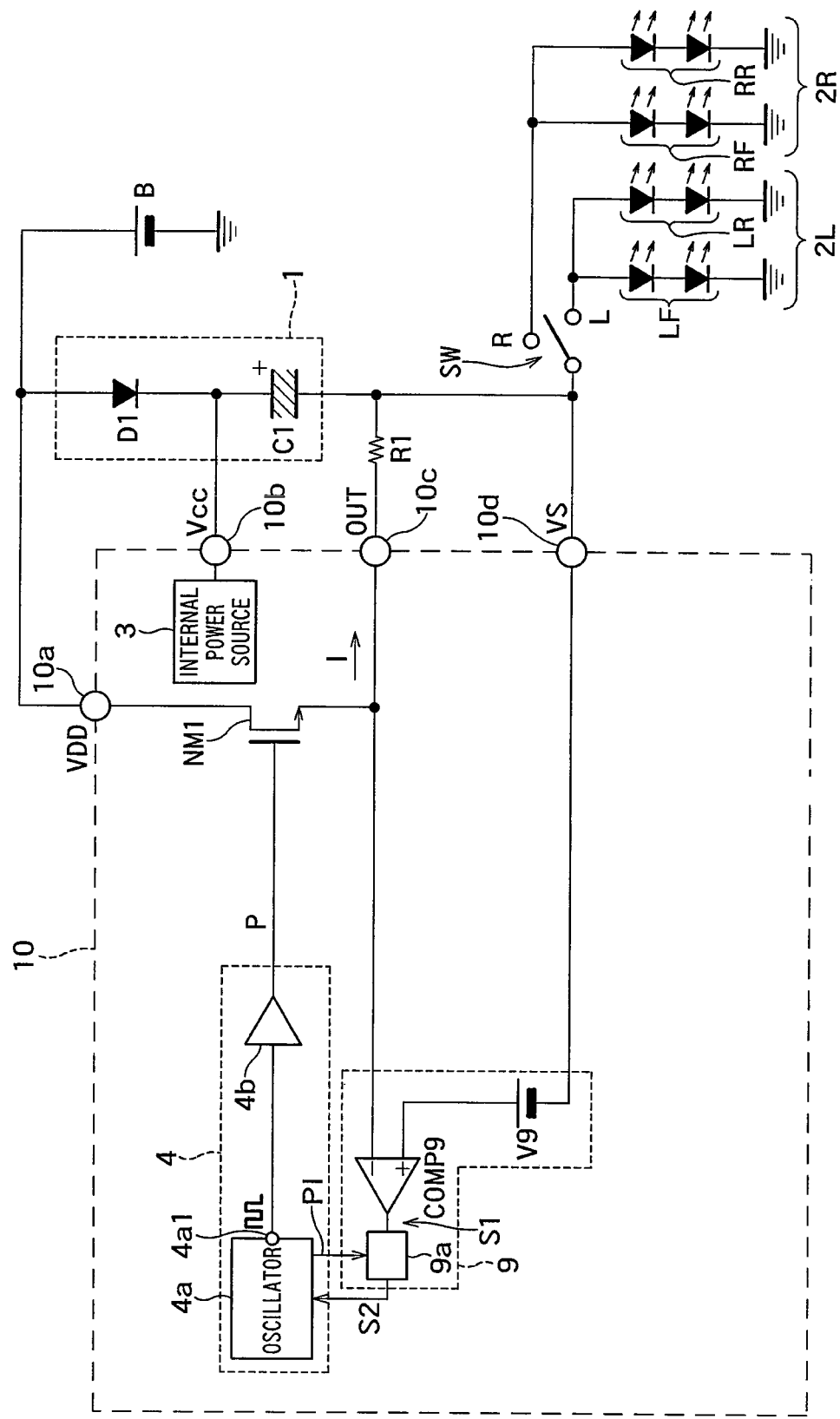
FIG. 1 is a circuit diagram of a direction indication device according to Embodiment 1 of the present invention.

FIG. 1 is a circuit diagram of a direction indication device according to Embodiment 1 of the present invention. As illustrated in FIG. 1, the direction indication device includes a bootstrap circuit 1, a direction indication switch SW, direction indication lamps 2L and 2R, an internal power source 3, a pulse signal generation unit 4, an N-type MOS transistor (a current control element) NM1, a current detection resistance R1, and a leak detection unit 9. The direction indication device is used in, for example, a motorcycle.

The internal power source 3, the pulse signal generation unit 4, the N-type MOS transistor NM1, and the leak detection unit 9 are configured as a direction indication lamp control device (a blinker relay) 10. The direction indication lamp control device 10 may be configured as, for example, a semiconductor integrated circuit.

The bootstrap circuit 1 has a diode (a rectifier) D1 and a capacitor C1. A power supply voltage VDD from a power source B is applied to an anode (one end) of the diode D1. One end of the capacitor C1 is connected to a cathode (the other end) of the diode D1, and the other end thereof is connected to one end of the direction indication switch SW.

The direction indication switch SW may enable a short-circuit to occur between one end and an L terminal (the other end), or between one end and an R terminal (the other end). The direction indication switch SW is a mechanical switch.

A left-side direction indication lamp 2L is configured with a left-front-side LED element LF and a left-rear-side LED element LR which are connected to each other in parallel. A right-side direction indication lamp 2R is configured with a right-front-side LED element RF and a right-rear-side LED element RR which are connected to each other in parallel. In Embodiment 1, each of the LED elements LF, LR, RF, and RR is configured with two LEDs which are connected in series.

An anode side (one end) of the direction indication lamp 2L is connected to an L terminal of the direction indication switch SW, and a cathode side (the other end) thereof is grounded. An anode side (one end) of the direction indication lamp 2R is connected to an R terminal of the direction indication switch SW, and a cathode side (the other end) thereof is grounded.

With this configuration, when the direction indication switch SW is in an ON state to the side of the L terminal or to the side of the R terminal, a current flows from the power source B to the ground GND via the diode D1, the capacitor C1, the direction indication switch SW, and the direction indication lamp 2L or 2R. Accordingly, the capacitor C1 is charged, and the bootstrap circuit 1 generates an internal power supply voltage Vcc, which is a voltage of one end of the capacitor C1, based on a reference voltage VS, which is a voltage of the other end of the capacitor C1. Even though the reference voltage VS changes, "(the internal power supply voltage Vcc)−(the reference voltage VS)" is held almost constant.

The internal power supply voltage Vcc is supplied to an internal power supply voltage terminal 10b of the direction indication lamp control device 10, and the reference voltage VS is supplied to a reference voltage terminal 10d of the direction indication lamp control device 10.

The internal power source 3 is activated using a potential difference between the internal power supply voltage Vcc and the reference voltage VS as a power source, and thus generates a bias voltage based on the reference voltage VS. The generated bias voltage is supplied to each unit in the direction indication lamp control device 10.

The pulse signal generation unit 4 is activated using a potential difference between an internal power supply voltage Vcc and a reference voltage VS as a power source, and generates a pulse signal P with a predetermined period (for example, 0.5 to 1 second). For example, the duty ratio of the pulse signal P is around 50 percent. Specifically, the pulse signal generation unit 4 has an oscillator 4a and a buffer 4b.

The oscillator 4a generates an internal oscillation pulse signal PI with the predetermined period, and buffers the internal oscillation pulse signal PI to output the result as the oscillation pulse signal. While a leak detection signal S2 is output from a leak detection signal output unit 9a, the oscillator 4a stops outputting the oscillation pulse signal. Specifically, the oscillator 4a has an oscillation pulse signal output terminal 4a1 outputting the oscillation pulse signal, and a switch element (not illustrated) which shorts the oscillation pulse signal output terminal 4a1 to one end of the direction indication switch SW (that is, the reference voltage VS) while the leak detection signal S2 is output from the leak detection signal output unit 9a.

The buffer 4b generates the pulse signal P by buffering the oscillation pulse signal from the oscillator 4a. The pulse signal P may have an amplitude up to the internal power supply voltage Vcc from the reference voltage VS.

An N-type MOS transistor NM1 has a drain (one end) connected to the power supply voltage terminal 10a of the direction indication lamp control device 10, to which the power supply voltage VDD is supplied, a gate (the control terminal) to which the pulse signal P is supplied, and a source (the other end) which outputs a drive current I. A magnitude of the drive current I corresponds to the amplitude of the pulse signal P. The source of the N-type MOS transistor NM1 is connected to a current output terminal 10c of the direction indication lamp control device 10.

The current detection resistance R1 is provided between the source of the N-type MOS transistor NM1 and one end of the direction indication switch SW. In Embodiment 1, the current detection resistance R1 is connected between the current output terminal 10c and one end of the direction indication switch SW.

With this configuration, the drive current I flows through the LED elements LF and LR of the direction indication lamp 2L or through the LED elements RF and RR of the direction indication lamp 2R, via the direction indication switch SW. Accordingly, the direction indication lamp 2L or 2R blinks at a period of the oscillation pulse signal.

The leak detection unit 9 causes the pulse signal generation unit 4 to decrease the amplitude of the pulse signal P, in a case where the drive current I corresponding to a pulse wave of the pulse signal P is equal to or less than a leak detection current value I1 during a leak detection period T1.

The leak detection current value I1 is lower than the drive current I which corresponds to the pulse wave of the pulse signal P when the direction indication switch SW is ON, and is equal to or more than the leak current of the direction indication switch SW, which may flow when the direction indication switch SW is OFF.

The leak detection period T1 is shorter than a period of time (for example, about 0.5 to 1 second) during which the pulse wave of the pulse signal P is output when the direction indication switch SW is ON. In Embodiment 1, for example, the leak detection period T1 is equal to or less than 200 microseconds. However, the proper leak detection period T1 varies depending on characteristics of the LED elements LF, LR, RF, and RR, the period of the pulse signal P, or the like. Furthermore, because a malfunction may also occur owing to noise from the outside in a case where the leak detection period T1 is too short, the leak detection period T1 is preferably determined by also taking the influence of the noise into consideration.

Specifically, the leak detection unit 9 has a comparator COMP9 for low-current detection and the leak detection signal output unit 9a. The comparator COMP9 for low-current detection compares a voltage between both ends of the current detection resistance R1 and a voltage V9 corresponding to the leak detection current value I1, and outputs the low-current detection signal S1 in a case where the drive current I is equal to or less than the leak detection current value I1. That is, in the comparator COMP9 for low-current detection, an inverting input terminal is connected to the current output terminal 10c, and the voltage V9 based on the reference voltage VS is supplied to a non-inverting input terminal.

The leak detection signal output unit 9a outputs a leak detection signal S2 in a case where the low-current detection signal S1 is output during the leak detection period T1. That is, the leak detection signal output unit 9a functions as a filter ignoring the low-current detection signal S1 which exists during a period which is shorter than the leak detection period T1. Furthermore, the internal oscillation pulse signal PI from the oscillator 4a is supplied to the leak detection signal output unit 9a, and the leak detection signal output unit 9a is reset at the timing of an occurrence of the pulse wave of the internal oscillation pulse signal PI.

Next, operation of the direction indication device is described with reference to a waveform chart.

Figure 2:
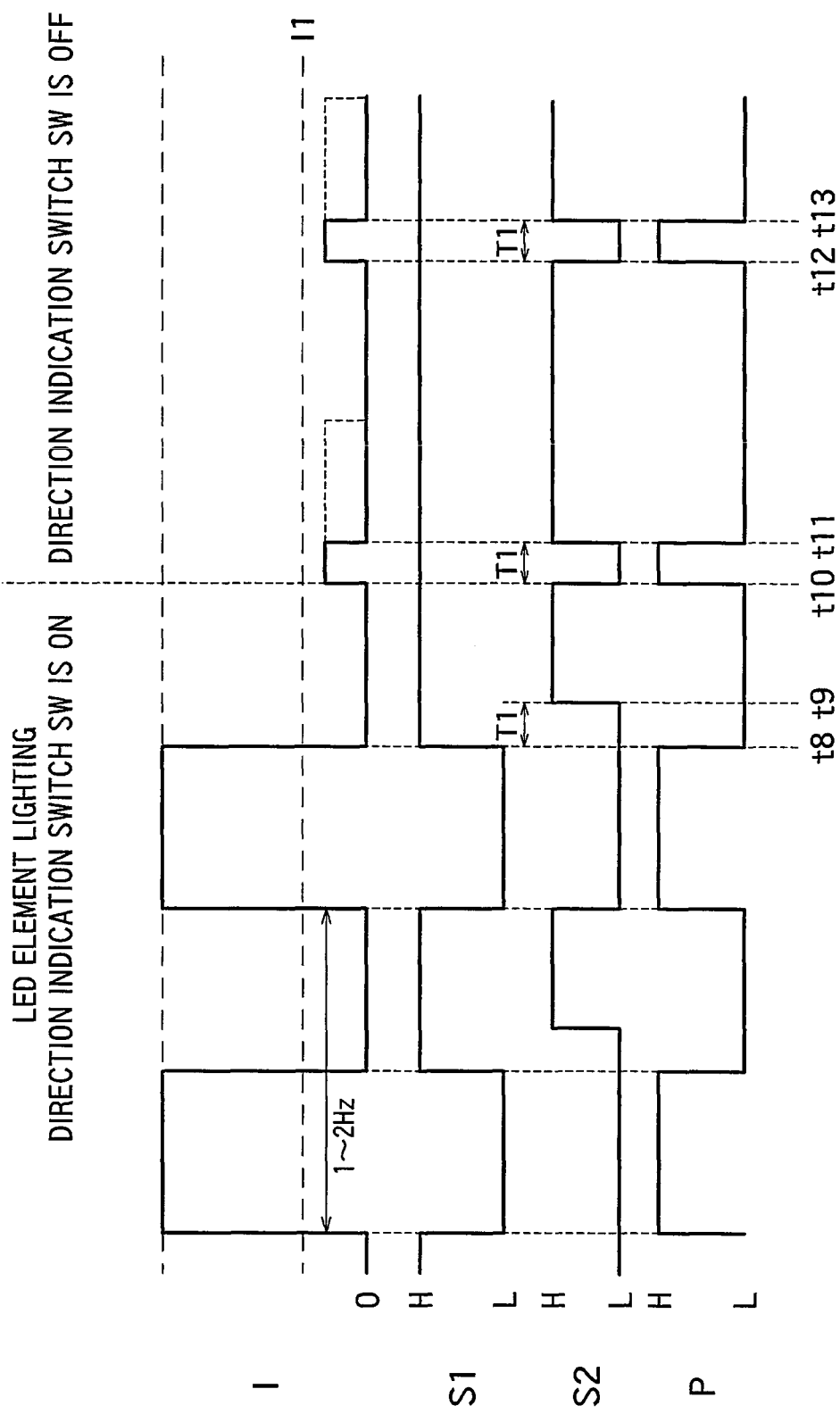
FIG. 2 is a waveform chart of the direction indication device according to Embodiment 1 of the present invention.

FIG. 2 is a waveform chart of the direction indication device according to Embodiment 1 of the present invention. FIG. 2 illustrates changes over time in the drive current I flowing through the direction indication lamp 2L, the low-current detection signal S1, the leak detection signal S2 and the pulse signal P, in a case where the direction indication switch SW is OFF at a point in time t10, after the direction indication switch SW is ON to the side of the L terminal. In the example illustrated, the leak current flows through the direction indication switch SW which is OFF, after the point in time t10. Furthermore, the low-current detection signal S1, the leak detection signal S2 and the pulse signal P show changes with respect to the reference voltage VS. That is, it is indicated that a low level (L) in FIG. 2 is a level which is almost equal to the reference voltage VS.

As illustrated in FIG. 2, until the point in time t10, the drive current I changes like a pulse at the period of the pulse signal P and the direction indication lamp 2L also blinks at the period. A maximum value of the drive current I is determined by the amplitude of the pulse signal P. As described above, for example, the period is an arbitrary value of 0.5 to 1 second, that is, a blinking frequency is an arbitrary value of 1 to 2 Hz.

Even at the point in time t10, the comparator COMP9 for low-current detection outputs a high level low-current detection signal S1 during a period during which the drive current I does not flow (for example, a point in time t8 to t10). And the leak detection signal output unit 9a outputs a high level leak detection signal S2, when the low-current detection signal 51 is output during the leak detection period T1 (for example, the point in time t9). The oscillator 4a shorts the oscillation pulse signal output terminal 4a1 to the reference voltage VS so that the pulse wave is not output, while the leak detection signal S2 is output. Subsequently, the leak detection signal output unit 9a is reset at the timing (the point in time t10) of an occurrence of the pulse wave of the internal oscillation pulse signal PI (not illustrated) and thus the leak detection signal S2 is at the low level. However, because the pulse wave of the pulse signal P is not output in the first place at the points in time t8 to t10, the operation of the leak detection unit 9 like this does not have an effect on a blinking operation when the direction indication switch SW is ON.

After the point in time t10 at which the direction indication switch SW is OFF, by the leak current flowing from one end of the direction indication switch SW, for example, to the L terminal, the bootstrap circuit 1 continues to work, that is, the direction indication device continues to work. The leak current is, for example, about 100 mA.

That is, regardless of the direction indication switch SW being OFF at the point in time t10, the pulse wave of the pulse signal P is output. Accordingly, the N-type MOS transistor NM1 outputs the drive current I. However, at this time the drive current I is limited to the leak current of the direction indication switch SW.

The comparator COMP9 for low-current detection continuously outputs the high level of the low-current detection signal S1, because the drive current I is equal to or less than the leak detection current value I1.

Thereafter, at the point in time t11, the leak detection signal output unit 9a outputs the high level of the leak detection signal S2 because the low-current detection signal 51 is output during the leak detection period T1. The oscillator 4a shorts the oscillation pulse signal output terminal 4a1 to the reference voltage VS so that the pulse wave of the oscillation pulse signal, that is, the pulse wave of the pulse signal P is not output, while the leak detection signal S2 is output. Accordingly, after the point in time t11 the drive current I is not output. Consequently, a period during which the drive current I is output, that is, a period during which the direction indication lamp 2L is lit is limited to the leak detection period T1.

Note that, after the point in time t11 the oscillator 4a does not output the pulse wave of the oscillation pulse signal, but outputs the internal oscillation pulse signal PI.

Thereafter, the leak detection signal output unit 9a is reset at the point in time t12, which is the timing of the occurrence of the pulse wave of the internal oscillation pulse signal PI, and thus the leak detection signal S2 is at the low level.

Accordingly, the pulse wave of the pulse signal P is output and the drive current I is also output. However, after the point in time t13 when the leak detection period T1 has passed, the drive current I is not output by the same operation as is described above.

In this way, after the point in time t10, the duty ratio of the pulse signal P is changed to a small degree. Thus, the drive current I also changes like a pulse at the changed duty ratio, and a lighting time of the LED element is, for example, equal to or less than 200 microseconds. Therefore, because the period of time for the leak current to light the LED element may be limited, the lighting of the LED element by the leak current may be made less visible.

As described above, according to Embodiment 1, the leak detection unit 9 causes the amplitude of the pulse signal P to decrease, in a case where the drive current I corresponding to the pulse wave of the pulse signal P is equal to or less than the leak detection current value I1 during the leak detection period T1. Accordingly, in a case where the leak current flows through the direction indication switch SW in an OFF state, the drive current I may be reduced to zero by the amplitude of the pulse signal P being decreased to zero. Therefore, since the period of time for the leak current to light the LED element may be limited to the leak detection period T1, the lighting of the LED element by the leak current may be made less visible.

Embodiment 2

Embodiment 2 is different from Embodiment 1 in operation of an oscillator 4a in a case where a leak detection signal S2 is output. That is, the oscillator 4a of Embodiment 2 stops outputting an oscillation pulse signal and automatically resumes outputting the oscillation pulse signal after a predetermined period, in a case where a leak detection signal S2 is output from a leak detection signal output unit 9a while a pulse wave of the oscillation pulse signal is output. Other circuit configurations are the same as described in Embodiment 1 illustrated in FIG. 1, and thus the illustration and description of the other configurations are not given.

Accordingly, in a case where the leak detection signal S2 is output, a direction indication lamp 2L or 2R stops a blinking operation for a predetermined period. For example, in FIG. 2, the blinking operation is stopped for the predetermined period after a point in time t11, so that a pulse signal P and a drive current I are made not to be output even at points in time t12 to t13. Therefore, since the period of time for the leak current to light the LED element may be limited to the leak detection period T1, the lighting of the LED element by the leak current may be made less visible.

Like this, in Embodiment 2, the same effect as in Embodiment 1 may also be obtained.

Embodiment 3

Embodiment 3 is configured to detect the wire disconnection of an LED element, in addition to Embodiment 1.

Figure 3:
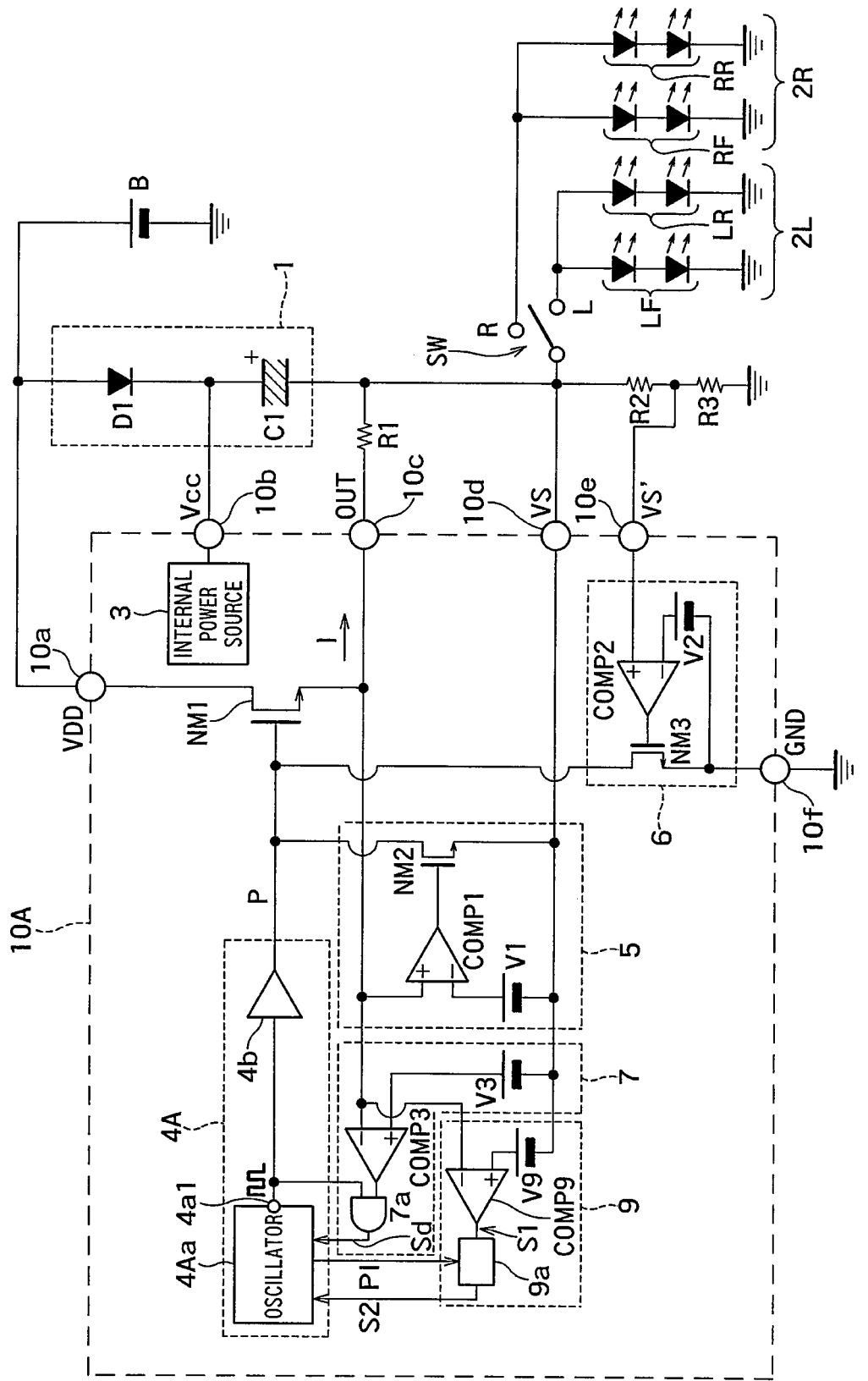
FIG. 3 is a circuit diagram of a direction indication device according to Embodiment 3 of the present invention.

FIG. 3 is a circuit diagram of a direction indication device according to Embodiment 3 of the present invention. As illustrated in FIG. 3, the direction indication device further includes a current clamp unit 5, a voltage clamp unit 6, a wire disconnection detection unit 7, and resistors R2 and R3, in addition to a direction indication device of Embodiment 1. Furthermore, the function of an oscillator 4Aa is different from the oscillator 4a of Embodiment 1. Because other circuit configurations are the same as described in Embodiment 1 of FIG. 1, the same components are given the same reference signs and the descriptions of the same components are not repeated.

An internal power source 3, a pulse signal generation unit 4A, an N-type MOS transistor NM1, a current clamp unit 5, a voltage clamp unit 6, a wire disconnection detection unit 7, and a leak detection unit 9 are configured as a direction indication lamp control device 10A.

The current clamp unit 5 limits a drive current I to a current upper limit value Imax by decreasing an amplitude of the pulse signal P, in a case where the drive current I exceeds the current upper limit value Imax. Specifically, the current clamp unit 5 has a first comparator COMP1 and an N-type MOS transistor (a first transistor) NM2.

The first comparator COMP1 compares a voltage between both ends of the current detection resistance R1 and a first voltage corresponding to the current upper limit value Imax. That is, in the first comparator COMP1, a non-inverting input terminal is connected to a current output terminal 10c and a first voltage V1 based on a reference voltage VS is supplied to an inverting input terminal.

The N-type MOS transistor NM2 includes a gate (a control terminal) to which a comparison result obtained by the first comparator COMP1 is supplied, a drain (one end) which is connected to the gate of an N-type MOS transistor NM1, and a source (the other end) which is connected to a reference voltage terminal 10d and to which the reference voltage VS is supplied.

The voltage clamp unit 6 limits the reference voltage VS to a voltage upper limit value VSmax by decreasing the amplitude of a pulse signal P, in a case where the reference voltage VS exceeds the voltage upper limit value VSmax. Specifically, the voltage clamp unit 6 has a second comparator COMP2 and an N-type MOS transistor (a second transistor) NM3.

The second comparator COMP2 compares the reference voltage VS and a voltage upper limit value Vmax. In Embodiment 3, in the second comparator COMP2, a non-inverting input terminal is connected to a division reference voltage terminal 10e to which a division reference voltage VS' corresponding to a reference voltage VS is supplied, and a second voltage V2 corresponding to the voltage upper limit value Vmax is supplied to an inverting input terminal. The second voltage V2 is a voltage based on the ground GND. Resistors R2 and R3 are connected in series between the reference voltage terminal 10d and the ground GND, and the division reference voltage terminal 10e is connected to a connection point of resistors R2 and R3.

An N-type MOS transistor NM3 includes a gate (a control terminal) to which a comparison result obtained by a second comparator COMP2 is supplied, a drain (one end) which is connected to the gate of an N-type MOS transistor NM1, and a source (the other end) which is connected to the ground GND via a ground terminal 10f.

The wire disconnection detection unit 7 outputs a wire disconnection detection signal Sd, in a case where the drive current I corresponding to the pulse wave of the pulse signal P is equal to or less than a wire disconnection detection value Id which is less than a current upper limit value Imax. The wire disconnection detection value Id is greater than the drive current I which flows through a direction indication lamp 2L when the reference voltage VS is the voltage upper limit value VSmax, in a case where it is assumed that any one of the LED elements LF and LR of a direction indication lamp 2L (or, any one of LED elements RF and RR of a direction indication lamp 2R) is disconnected.

Specifically, the wire disconnection detection unit 7 has a third comparator COMP3 and an AND circuit 7a. The third comparator COMP3 compares the voltage between both ends of the current detection resistance R1 and a third voltage V3 corresponding to the wire disconnection detection value Id. That is, in the third comparator COMP3, an inverting input terminal is connected to a current output terminal 10c and a third voltage V3 based on a reference voltage VS is supplied to a non-inverting input terminal.

The AND circuit 7a outputs a logical product of a comparison result obtained by the third comparator COMP3 and an oscillation pulse signal (a pulse signal P) as a wire disconnection detection signal Sd.

The wire disconnection detection signal Sd is supplied to an oscillator 4Aa. The oscillator 4Aa changes a period of the oscillation pulse signal, after a high level of the wire disconnection detection signal Sd is output. That is, a pulse signal generation unit 4A changes a period of the pulse signal P, after the high level of the wire disconnection detection signal Sd is output. The period of the pulse signal P may be shortened (for example, 0.25 to 1/(2.4) second) and may be lengthened. Otherwise, the pulse signal generation unit 4A may fix the pulse signal P to a high level, so that the drive current I continuously flows, after the high level of the wire disconnection detection signal Sd is output.

The oscillator 4Aa is configured by adding a function based on the wire disconnection detection signal Sd to the oscillator 4a of Embodiment 1.

Next, a relation between the current upper limit value Imax and the voltage upper limit value VSmax is described.

Figure 4:
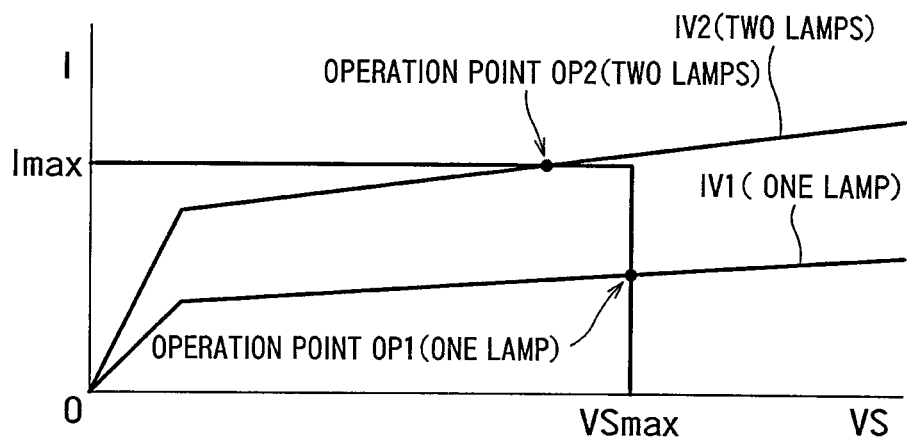
FIG. 4 is a view to describe an operation point of the direction indication device according to Embodiment 3 of the present invention.

FIG. 4 is a view to describe an operation point of the direction indication device according to Embodiment 3 of the present invention. At this point, a direction indication lamp 2L will be described. FIG. 4 illustrates characteristic lines showing relations between the drive current I flowing through the direction indication lamp 2L, and the reference voltage VS applied to the direction indication lamp 2L, in a case (the characteristic line IV2 (two lamps)) where two LED elements LF and LR of the direction indication lamp 2L are lit, and in a case (the characteristic line IV1 (one lamp)) where any one of the LED elements of the direction indication lamp 2L is disconnected and thus one LED element is lit.

As illustrated in FIG. 4, the current upper limit value Imax is smaller than the drive current I which may flow through the direction indication lamp 2L when the reference voltage VS is the voltage upper limit value VSmax on the characteristic line 1V2. Furthermore, the current upper limit value Imax is greater than the drive current I which flows through the direction indication lamp 2L when the reference voltage VS is the voltage upper limit value VSmax on the characteristic line IV1, in a case where it is assumed that any one of the LED elements of the direction indication lamp 2L is disconnected.

By setting the current upper limit value Imax and the voltage upper limit value VSmax as described above, in a case where two LED elements are lit, the direction indication device operates at an operation point OP2 on the characteristic line IV2, where the drive current I is the current upper limit value Imax and the reference voltage VS is a value smaller than the voltage upper limit value VSmax. Furthermore, in a case where one LED element is lit, the direction indication device operates at an operation point OP1 on the characteristic line IV1, where the reference voltage VS is the voltage upper limit value VSmax and the drive current I is a value smaller than the current upper limit value Imax.

Figure 5:
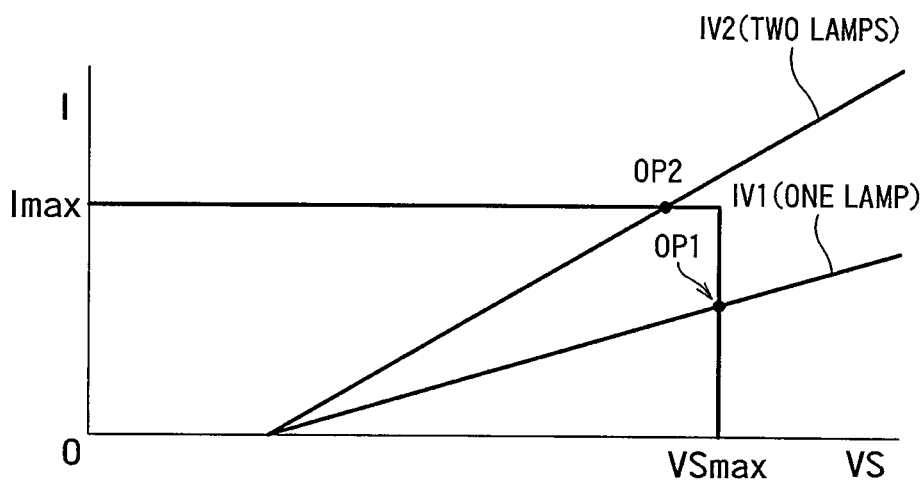
FIG. 5 is another view to describe an operation point of the direction indication device according to Embodiment 3 of the present invention.

Furthermore, FIG. 5 illustrates similar characteristic line to FIG. 4, with respect to a LED element through which the current flows when the reference voltage VS is equal to or more than a forward voltage. Even in a case where the characteristics of the LED element are different from those in the example of FIG. 4, as illustrated in FIG. 5, the current upper limit value Imax and the voltage upper limit value VSmax may be set in the same manner as is described above.

Next, operation of the direction indication device, for example, in a case where the direction indication lamp 2L blinks, will be described.

Figure 6:
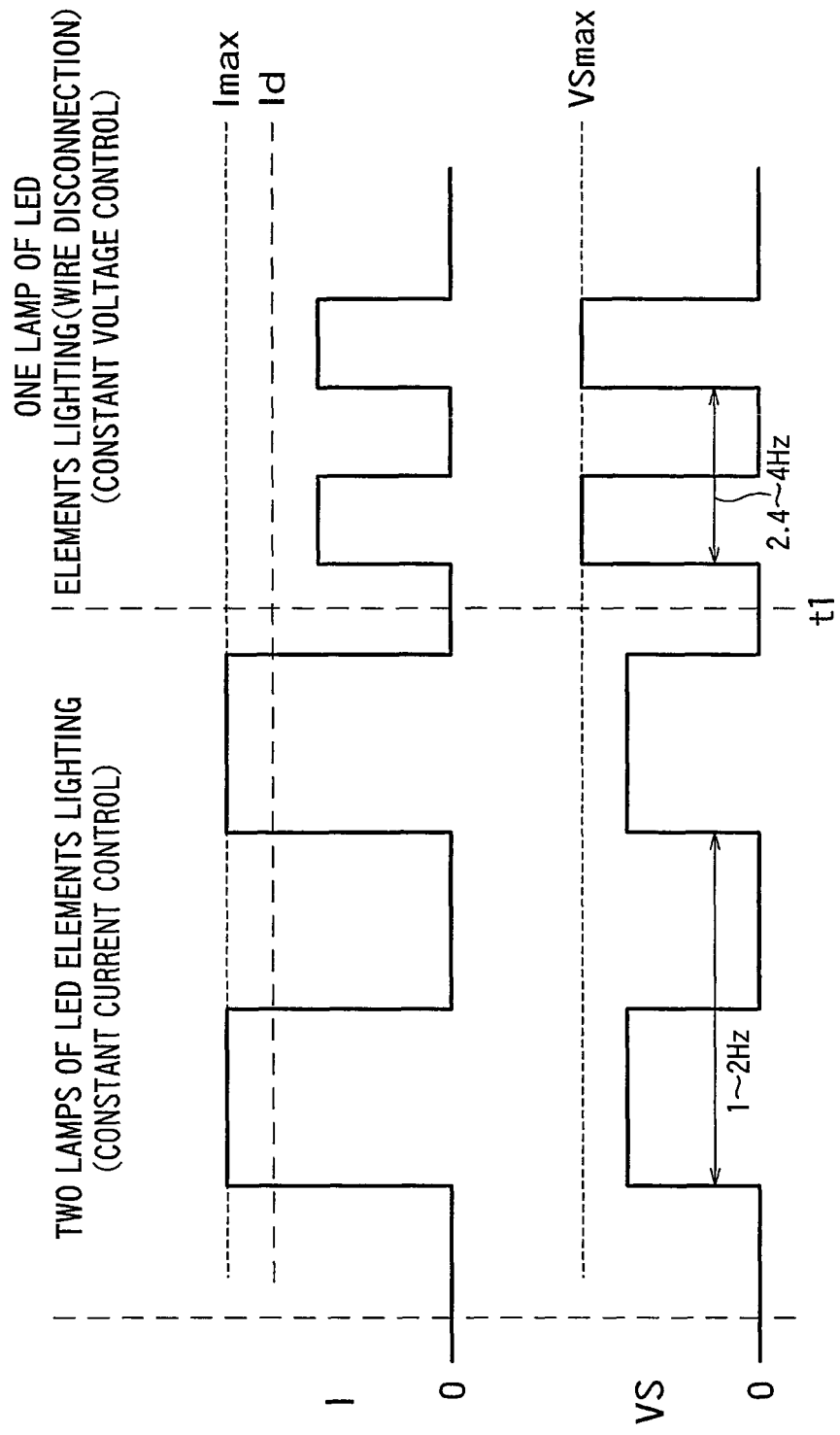
FIG. 6 is a waveform chart of the direction indication device according to Embodiment 3 of the present invention.

FIG. 6 is a waveform chart of the direction indication device according to Embodiment 3 of the present invention. FIG. 6 illustrates changes over time in the drive current I flowing through the direction indication lamp 2L and the reference voltage VS applied to the direction indication lamp 2L when the direction indication switch SW is ON to the side of the L terminal. In the example illustrated, at the point in time t1, any one of the LED elements of the direction indication lamp 2L is disconnected.

Until the point in time t1, as described above, the direction indication device operates at the operation point OP2 in FIG. 4. That is, the current clamp unit 5 limits the drive current I to the current upper limit value Imax, by decreasing the amplitude of the pulse signal P, in a case where the drive current I exceeds the current upper limit value Imax. Namely, the drive current I is controlled in such a manner as to maintain a constant current. At this time, the N-type MOS transistor NM3 of the voltage clamp unit 6 is OFF, and thus does not influence the control of the amplitude of the pulse signal P.

As illustrated in FIG. 6, the drive current I and the reference voltage VS change like a pulse at a period of the pulse signal P, and the direction indication lamp 2L also blinks at such a period. As is described above, for example, the period is an arbitrary value of 0.5 to 1 second, that is, a blinking frequency is an arbitrary value of 1 to 2 Hz.

After the point in time t1 at which a wire disconnection occurs, as described above, the operation point OP2 of FIG. 4 moves to the operation point OP1. That is, the voltage clamp unit 6 limits the reference voltage VS to the voltage upper limit value VSmax by decreasing the amplitude of the pulse signal P, in a case where the reference voltage VS exceeds the voltage upper limit value VSmax. Namely, the reference voltage VS is controlled in such a manner as to maintain a constant voltage. At this time, the N-type MOS transistor NM2 of the current clamp unit 5 is OFF, and thus does not influence the control of the amplitude of the pulse signal P.

During a period for which the drive current I when the direction indication lamp 2L is lighted, namely, the drive current I corresponding to the pulse wave of the pulse signal P, is equal to or less than the wire disconnection detection value Id, the wire disconnection detection unit 7 outputs a high level of the wire disconnection detection signal Sd.

Accordingly, the period of the pulse signal P is changed. As described above, for example, the changed period is an arbitrary value of 0.25 to 1/(2.4) second, that is, the frequency is an arbitrary value of 2.4 to 4 Hz. Thus, the drive current I and the reference voltage VS also change like a pulse at the changed period of the pulse signal P and the direction indication lamp 2L also blinks at such a period. By a blinking period of the direction indication lamp 2L being made to be different than at a normal operation, the wire disconnection of the LED element may be reported to a user or the like.

As described above, according to Embodiment 3, in a case where the drive current I supplied to the LED elements LF and LR or RF and RR exceeds the current upper limit value Imax, the current clamp unit 5 limits the drive current I to the current upper limit value Imax by decreasing the amplitude of the pulse signal P. In addition, in a case where the reference voltage VS applied to the LED elements LF and LR or RF and RR exceeds the voltage upper limit value VSmax, the voltage clamp unit 6 limits the reference voltage VS to the voltage upper limit value VSmax by decreasing the amplitude of the pulse signal P. Furthermore, the current upper limit value Imax is smaller than the drive current I which may flow through the direction indication lamp 2L or 2R when the reference voltage VS is the voltage upper limit value VSmax.

By the current upper limit value Imax and the voltage upper limit value VSmax being set to the relation like this, the reference voltage VS does not reach the voltage upper limit value VSmax at a time of normal operation, and the drive current I is controlled so as to be the current upper limit value Imax. Namely, since the constant current flows through the LED element LF and LR or RF and RR, this causes the LED elements to have an increased lifetime, and may stabilize the amount of light.

On the other hand, in a case where any one of the LED elements LF and LR connected in parallel (or, any one of the LED elements RF and RR connected in parallel) is disconnected, the reference voltage VS is controlled so that the drive current I does not reach the current upper limit value Imax and the reference voltage VS is the voltage upper limit value VSmax, because the drive current I which may flow through the direction indication lamp 2L (or, 2R) at a certain reference voltage VS is decreased more than at a time of normal operation.

Consequently, in a case where the drive current I corresponding to the pulse wave of the pulse signal P is equal to or less than the wire disconnection detection value Id which is smaller than the current upper limit value Imax, the wire disconnection of the LED element may be detected.

Additionally, even in a case where any one of the LED element is disconnected, the drive current I flowing through the remaining LED element may be limited because the reference voltage VS is limited to the voltage upper limit value VSmax. Therefore, the lifetime of the remaining LED element may be extended.

In addition to the above, as in Embodiment 1, in a case where the leak current flows through the direction indication switch SW in an OFF state, the leak detection unit 9 may reduce the drive current I to zero by decreasing the amplitude of the pulse signal P to zero. Therefore, since the period of time for the leak current to light the LED element may be limited to the leak detection period T1, the lighting of the LED element by the leak current may be made less visible.

Embodiment 4

Embodiment 4 is different from Embodiment 3, in a configuration of the wire disconnection detection unit.

Figure 7:
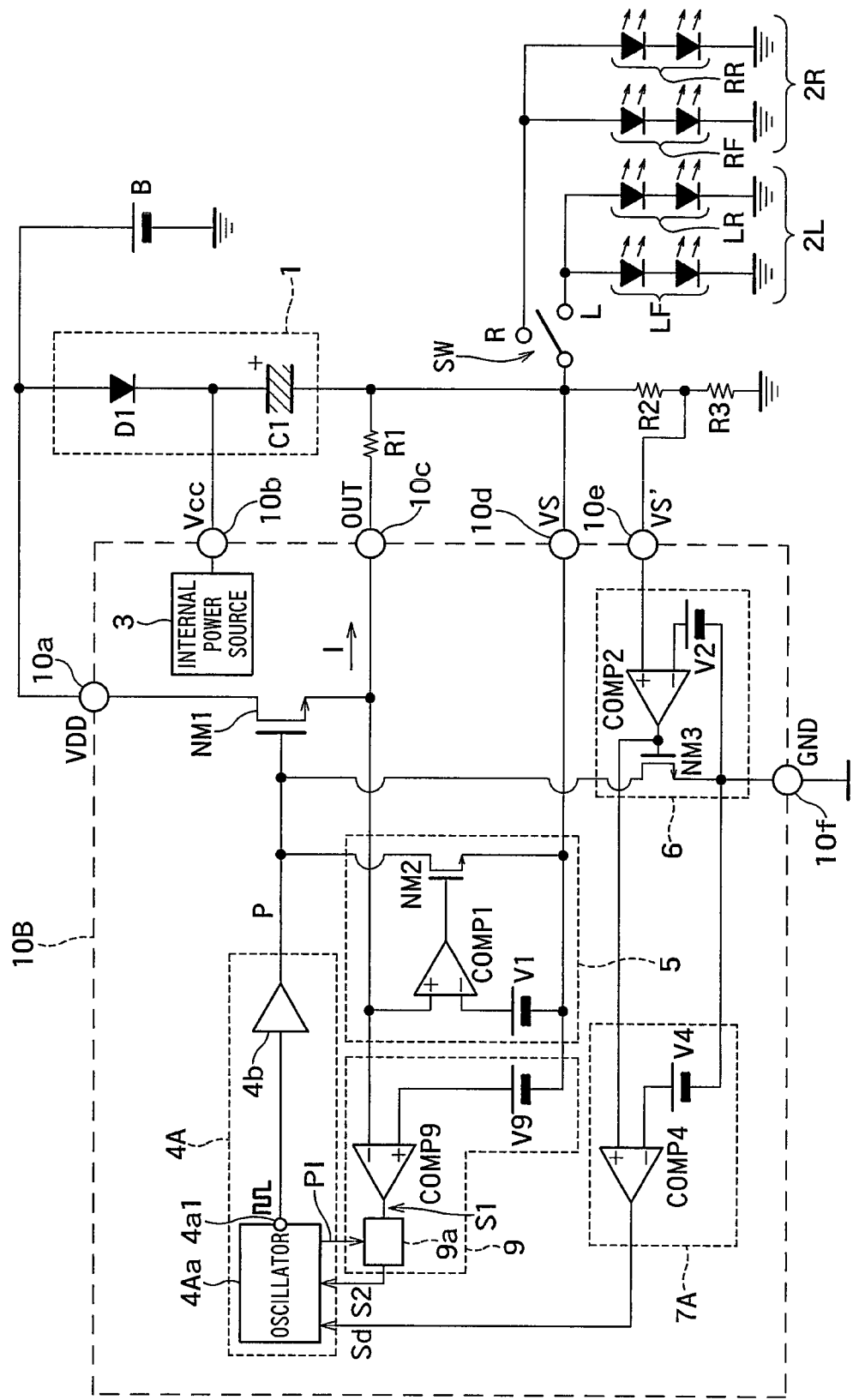
FIG. 7 is a circuit diagram of a direction indication device according to Embodiment 4 of the present invention.
Figure 8:
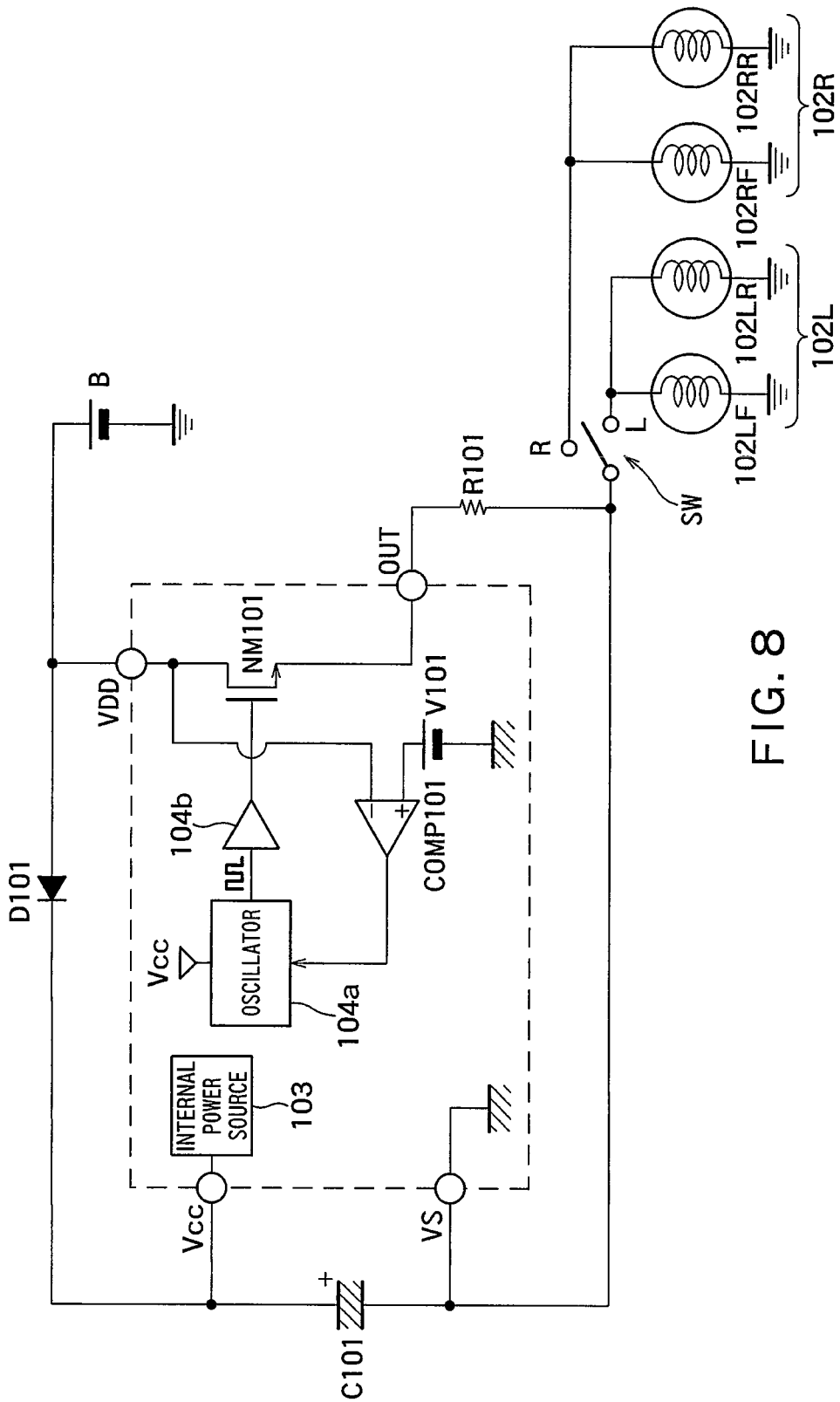
FIG. 8 is a circuit diagram of a conventional direction indication device.

FIG. 7 is a circuit diagram of a direction indication device according to Embodiment 4 of the present invention. As illustrated in FIG. 7, the direction indication lamp control device 10B includes a wire disconnection detection unit 7A instead of the wire disconnection detection unit 7 of Embodiment 3. Because other circuit configurations are the same as are described in Embodiment 3 of FIG. 3, the same components are given the same reference signs and the descriptions of the same components are not repeated.

The wire disconnection detection unit 7A outputs a wire disconnection detection signal Sd, in a case where a reference voltage VS is equal to a voltage upper limit value VSmax. Specifically, the wire disconnection detection unit 7A has a fourth comparator COMP4. In the fourth comparator COMP4, the comparison result obtained by the second comparator COMP2 is supplied to a non-inverting input terminal and a fourth voltage V4 corresponding to a voltage upper limit value VSmax is supplied to an inverting input terminal. The fourth comparator COMP4 outputs a comparison result as a wire disconnection detection signal Sd. The fourth voltage V4 is a voltage based on the ground GND.

An operation waveform of the direction indication device is the same as illustrated in FIG. 6. Namely, after a point in time t1 at which a wire disconnection occurs, a reference voltage VS applied when a direction indication lamp 2L or 2R is lighted is controlled in such a manner as to be a voltage upper limit value VSmax. During a period for which the reference voltage VS is controlled to the voltage upper limit value VSmax, the comparison result obtained by the second comparator COMP2 is higher than a low level. Accordingly, the fourth comparator COMP4 detects this state and a high level of the wire disconnection detection signal Sd is output. Therefore, by the blinking period of the direction indication lamp 2L or 2R being changed, the wire disconnection of the LED element may be reported to a user or the like.

Namely, in Embodiment 4, the same effect as in Embodiment 3 may also be obtained.

Although the embodiments of the present invention have been described in detail, the specific constitution is not limited to these embodiments and can be modified variously without departing the gist of the present invention.

For example, the direction indication lamp control devices 10, 10A, and 10B may be configured using a bipolar transistor instead of the MOS transistor.

Furthermore, the number of the LED elements configuring each of the direction indication lamps 2L and 2R may be equal to or more than 3. The number of the LEDs configuring each of the LED elements LF, LR, RF, and RR may be 1 or may be equal to or more than 3.

Furthermore, an example in which the diode D1 is used in the bootstrap circuit 1 is described, but the configuration is not limited to this. Instead of the diode D1, a transistor may be used, which is controlled so as to permit the current to flow through a capacitor C1 when a power supply voltage VDD is greater than an internal power supply voltage Vcc, and so as to interrupt the current from the capacitor C1 when the power supply voltage VDD is smaller than the internal power supply voltage Vcc, and which functions as a rectifier.

DESCRIPTION OF REFERENCE NUMERALS

1 Bootstrap circuit
SW Direction indication switch
2L, 2R Direction indication lamp
LF, LR, RF, RR LED element
3 Internal power source
4, 4A Pulse signal generation unit
4a, 4Aa Oscillator
4b Buffer
5 Current clamp unit
6 Voltage clamp unit
7, 7A Wire disconnection detection unit
9 Leak detection unit
9a Leak detection signal output unit
10, 10A, 10B Direction indication lamp control device
R1 Current detection resistance
R2, R3 Resistor
D1 Diode (rectifier)
C1 Capacitor
NM1 N-type MOS transistor (current control element)
NM2 N-type MOS transistor (first transistor)
NM3 N-type MOS transistor (second transistor)
COMP1 First comparator
COMP2 Second comparator
COMP3 Third comparator
COMP4 Fourth comparator
COMP9 Comparator for low-current detection

The invention claimed is:

1. A direction indication lamp control device for controlling a direction indication lamp configured with LED elements connected in parallel, comprising:

a pulse signal generation unit that generates a pulse signal having a predetermined period;

a current control element comprising one end to which power supply voltage is supplied, a control terminal to which the pulse signal is supplied, and the other end which outputs a drive current having a magnitude corresponding to amplitude of the pulse signal, the other end of the current control element being connected to one end of an external direction indication switch, and the other end of the direction indication switch being connected to the direction indication lamp; and a leak detection unit that causes the pulse signal generation unit to decrease the amplitude of the pulse signal in a case where the drive current corresponding to a pulse wave of the pulse signal is equal to or less than a leak detection current value during a leak detection period.

2. The direction indication lamp control device according to claim 1, wherein the leak detection current value is smaller than the drive current corresponding to the pulse wave of the pulse signal when the direction indication switch is ON, and is equal to or more than a leak current of the direction indication switch which flows when the direction indication switch is OFF.

3. The direction indication lamp control device according to claim 1, wherein the leak detection period is shorter than a period of time for which the pulse wave of the pulse signal is output when the direction indication switch is ON.

4. The direction indication lamp control device according to claim 1, wherein the pulse signal generation unit comprises:

an oscillator which generates an internal oscillation pulse signal having the predetermined period and buffers the internal oscillation pulse signal to output an oscillation pulse signal; and a buffer which buffers the oscillation pulse signal and outputs the buffered oscillation pulse signal as the pulse signal, wherein the leak detection unit comprises:

a comparator for low-current detection, which outputs a low-current detection signal in a case where the drive current is equal to or less than the leak detection current value; and a leak detection signal output unit which outputs a leak detection signal in a case where the low-current detection signal is output during the leak detection period and is reset at the timing of an occurrence of a pulse wave of the internal oscillation pulse signal, and wherein the oscillator stops outputting the oscillation pulse signal while the leak detection signal is output from the leak detection signal output unit.

5. The direction indication lamp control device according to claim 4, wherein the oscillator comprises:

an oscillation pulse signal output terminal which outputs the oscillation pulse signal; and a switch element which shorts the oscillation pulse signal output terminal to one end of the direction indication switch while the leak detection signal is output from the leak detection signal output unit.

6. The direction indication lamp control device according to claim 1, wherein the pulse signal generation unit comprises:

an oscillator which generates an internal oscillation pulse signal having the predetermined period and buffers the internal oscillation pulse signal to output an oscillation pulse signal; and a buffer which buffers the oscillation pulse signal and outputs the buffered oscillation pulse signal as the pulse signal, wherein the leak detection unit comprises:

a comparator, which outputs a low-current detection signal in a case where the drive current is equal to or less than the leak detection current value; and a leak detection signal output unit which outputs a leak detection signal in a case where the low-current detection signal is output during the leak detection period and is reset at the timing of an occurrence of a pulse wave of the internal oscillation pulse signal, and wherein the oscillator stops outputting the oscillation pulse signal in a case where the leak detection signal is output from the leak detection signal output unit while the pulse wave of the oscillation pulse signal is output, and resumes outputting the oscillation pulse signal after a predetermined period.

7. The direction indication lamp control device according to claim 1, wherein a period of time for which the pulse wave of the pulse signal is output when the direction indication switch is ON ranges from 0.25 seconds to 0.5 seconds, and wherein the leak detection period is equal to or less than 200 microseconds.

8. The direction indication lamp control device according to claim 1, comprising:

a current clamp unit which limits the drive current to a current upper limit value by decreasing amplitude of the pulse signal, in a case where the drive current exceeds the current upper limit value;

a voltage clamp unit which limits a reference voltage of one end of the direction indication switch to a voltage upper limit value by decreasing the amplitude of the pulse signal, in a case where the reference voltage exceeds the voltage upper limit value; and a wire disconnection detection unit which outputs a wire disconnection detection signal in a case where the drive current corresponding to the pulse wave of the pulse signal is equal to or less than a wire disconnection detection value which is less than the current upper limit value, or in a case where the reference voltage is equal to the voltage upper limit value, wherein the current upper limit value is smaller than the drive current flowing through the direction indication lamp when the reference voltage is the voltage upper limit value.

9. The direction indication lamp control device according to claim 8, wherein the current upper limit value is greater than the drive current which flows through the direction indication lamp when the reference voltage is the voltage upper limit value in a case where it is assumed that any one of the LED elements is disconnected.

10. The direction indication lamp control device according to claim 8, wherein the wire disconnection detection value is greater than the drive current which flows through the direction indication lamp when the reference voltage is the voltage upper limit value in a case where it is assumed that any one of the LED elements is disconnected.

11. The direction indication lamp control device according to claim 1, wherein the pulse signal generation unit operates using a potential difference between an internal power supply voltage supplied from an external bootstrap circuit, and the reference voltage, as a power source, and wherein the bootstrap circuit generates the internal power supply voltage based on the reference voltage when the direction indication switch is ON.

12. The direction indication lamp control device according to claim 11, wherein the bootstrap circuit comprises:

a rectifier, the power supply voltage being applied to one end of the rectifier; and a capacitor, one end of the capacitor being connected to the other end of the rectifier and the other end of the capacitor being connected to one end of the direction indication switch, wherein a voltage of one end of the capacitor is the internal power supply voltage, and a voltage of the other end of the capacitor is the reference voltage.

13. The direction indication lamp control device according to claim 11, wherein the current control element is configured with an N-type MOS transistor that comprises a drain to which the power supply voltage is supplied, a gate to which the pulse signal is supplied, and a source connected to the direction indication switch.

14. A method of controlling a direction indication device that comprises: a pulse signal generation unit that generates a pulse signal having a predetermined period; a current control element that comprises one end to which the pulse signal is supplied, a control terminal to which the pulse signal is supplied, and the other end that outputs a drive current having a magnitude corresponding to amplitude of the pulse signal; a direction indication switch, one end of the direction indication switch being connected to the other end of the current control element; and a direction indication lamp configured with LED elements connected in parallel, one end of the direction indication lamp being connected to the other end of the direction indication switch, and the other end of the direction indication lamp being grounded, the method comprising causing the pulse signal generation unit to decrease the amplitude of the pulse signal in a case where the drive current corresponding to a pulse wave of the pulse signal is equal to or less than a leak detection current value during a leak detection period.

* * * * *